(12) United States Patent
Michalakis

(10) Patent No.: US 10,572,563 B2
(45) Date of Patent: Feb. 25, 2020

(54) MOBILE COMPUTING SYSTEMS AND METHODS FOR ACCESSING DATA

(71) Applicant: Toyota Research Institute, Inc., Los Altos, CA (US)

(72) Inventor: Nikolaos Michalakis, Saratoga, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 371 days.

(21) Appl. No.: 15/479,511

(22) Filed: Apr. 5, 2017

(65) Prior Publication Data

US 2018/0293248 A1    Oct. 11, 2018

(51) Int. Cl.
*G06F 16/9537*    (2019.01)

(52) U.S. Cl.
CPC ................... *G06F 16/9537* (2019.01)

(58) Field of Classification Search
CPC ................................................. G06F 16/9537
See application file for complete search history.

(56) References Cited

U.S. PATENT DOCUMENTS

| 8,803,343 | B2 | 8/2014 | Tseng et al. | |
|---|---|---|---|---|
| 2004/0202132 | A1* | 10/2004 | Heinonen | H04W 28/16 370/331 |
| 2006/0082263 | A1 | 4/2006 | Rimler et al. | |
| 2007/0089110 | A1* | 4/2007 | Li | H04L 67/2847 717/178 |
| 2007/0142036 | A1* | 6/2007 | Wikman | H04W 88/04 455/414.1 |
| 2009/0050591 | A1 | 2/2009 | Hart et al. | |
| 2010/0070600 | A1* | 3/2010 | Schulzrinne | G06F 16/951 709/206 |

(Continued)

FOREIGN PATENT DOCUMENTS

| CN | 103383713 A | 11/2013 |
|---|---|---|
| CN | 102561743 B | 2/2014 |

(Continued)

OTHER PUBLICATIONS

AWS Massive Exabyte-Scale Data Transfer Service, Amazon Web Services, Inc., https://aws.amazon.com/snowmobile/, 2017, 4 pages.

*Primary Examiner* — Jensen Hu
(74) *Attorney, Agent, or Firm* — Dinsmore & Shohl LLP

(57) ABSTRACT

A mobile computing system for accessing data moves between a first geographic location where internet access is not available and a second geographic location where internet access is available. The mobile computing system receives a query from a computing device at the first geographic location, retrieves data associated with the query from the mobile computing system and provides the data to the computing device in response to the query if the data associated with the query is available in the mobile computing system at the first geographic location, stores the query in the one or more memory modules if the data associated with the query is not available in the mobile computing system at the first geographic location, executes the stored query at the second geographic location and retrieves data associated with the query from the internet, and stores the data in the one or more memory modules.

20 Claims, 4 Drawing Sheets

(56) References Cited

U.S. PATENT DOCUMENTS

| | | | | |
|---|---|---|---|---|
| 2011/0072006 A1* | 3/2011 | Yu | ................ | G06F 16/2471 |
| | | | | 707/718 |
| 2016/0104486 A1* | 4/2016 | Penilla | ................ | H04L 67/12 |
| | | | | 704/232 |
| 2018/0035259 A1* | 2/2018 | Castelli | ................ | H04W 4/029 |

FOREIGN PATENT DOCUMENTS

| | | |
|---|---|---|
| CN | 102535896 B | 4/2014 |
| JP | 2015007901 A | 1/2015 |

\* cited by examiner

MOBILE COMPUTING SYSTEMS AND METHODS FOR ACCESSING DATA

TECHNICAL FIELD

The present specification relates to mobile computing systems and methods for accessing online data.

BACKGROUND

A computing device typically requires access to a network that is connected to the internet in order to access the internet. However, some areas of the world do not have access to such networks because hardware is not in place to connect a network to the internet.

Accordingly, a need exists for providing remote access to data to various parts of the world that may not have internet access.

SUMMARY

In one embodiment, a mobile computing system for accessing data moves between a first geographic location where internet access is not available and a second geographic location where internet access is available. The mobile computing system includes one or more processors, one or more memory modules communicatively coupled to the one or more processors, and machine readable instructions stored in the one or more memory modules that, when executed by the one or more processors, cause the mobile computing system to: receive a query from a computing device at the first geographic location where internet access is not available, retrieve data associated with the query from the mobile computing system and provide the data to the computing device in response to the query if the data associated with the query is available in the mobile computing system at the first geographic location, store the query in the one or more memory modules if the data associated with the query is not available in the mobile computing system at the first geographic location, execute the stored query at the second geographic location where internet access is available and retrieve data associated with the query from the internet, and store the data associated with the query in the one or more memory modules for retrieval by the computing device when the mobile computing system returns to the first geographic location.

In another embodiment, a method for accessing data includes receiving, by a mobile computing system, a query from a computing device at a first geographic location where internet access is not available, retrieving data associated with the query from one or more memory modules of the mobile computing system and providing the data to the computing device in response to the query if the data associated with the query is available in the one or more memory modules of the mobile computing system at the first geographic location, storing the query in the one or more memory modules if the data associated with the query is not available in the mobile computing system at the first geographic location, executing the stored query at a second geographic location where internet access is available and retrieving data associated with the query, and storing the data associated with the query in the one or more memory modules for retrieval by the computing device when the mobile computing system returns to the first geographic location.

In yet another embodiment, a mobile computing system includes a vehicle, and a moveable server coupled to the vehicle. The vehicle moves between a first geographic location where internet access is not available and a second geographic location where internet access is available. The moveable server includes one or more processors, one or more memory modules communicatively coupled to the one or more processors, and machine readable instructions stored in the one or more memory modules that, when executed by the one or more processors, cause the moveable server to: receive a query from a computing device at the first geographic location where internet access is not available, retrieve data associated with the query from the moveable server and provide the data to the computing device in response to the query if the data associated with the query is available in the moveable server at the first geographic location, store the query in the one or more memory modules if the data associated with the query is not available in the moveable server at the first geographic location, execute the stored query at the second geographic location where internet access is available and retrieve data associated with the query from the internet, and store the data associated with the query in the one or more memory modules for retrieval by the computing device when the moveable server returns to the first geographic location.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
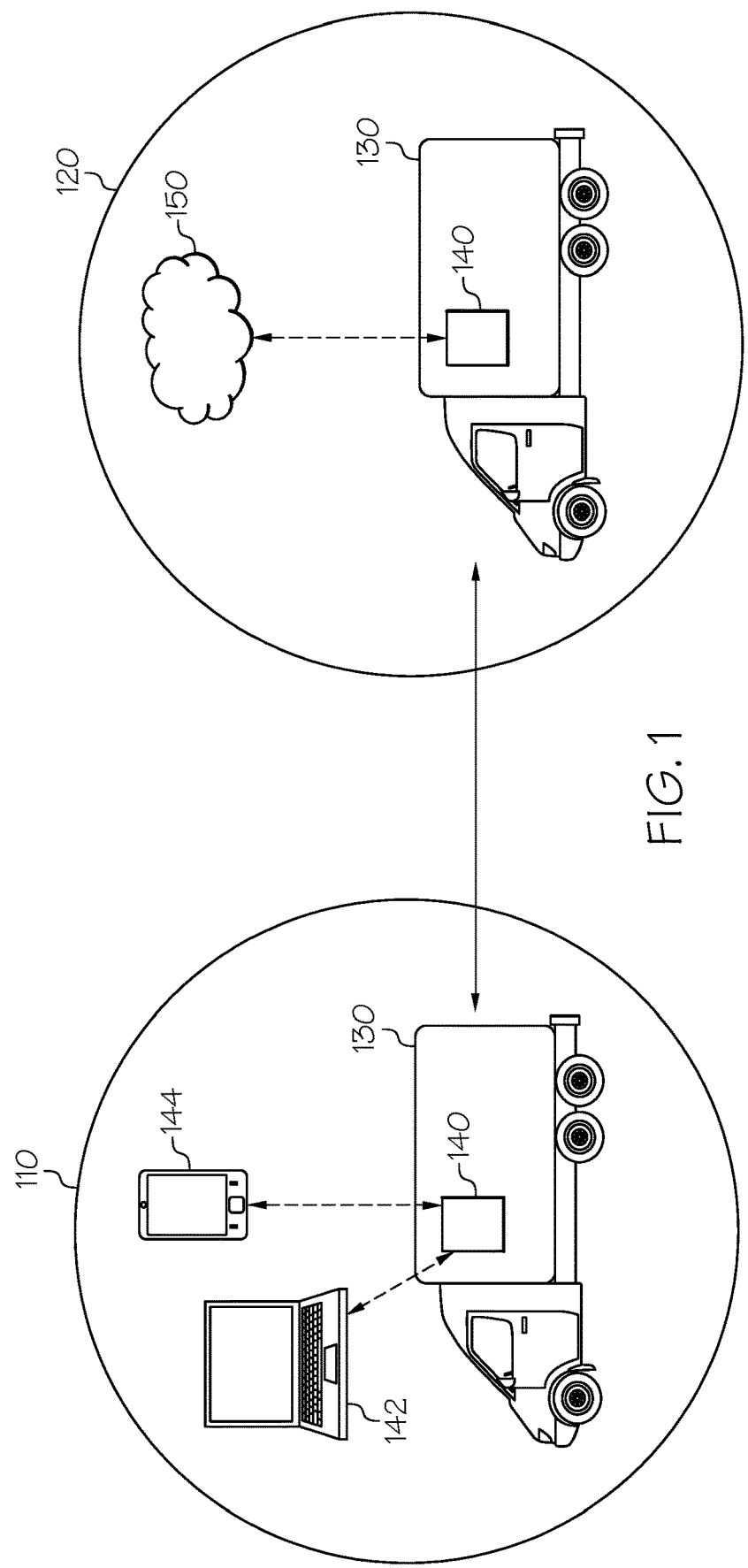
FIG. 1 schematically depicts a mobile computing system for accessing data on the internet via a vehicle having a moveable server in accordance with one or more embodiments shown and described herein.
Figure 2:
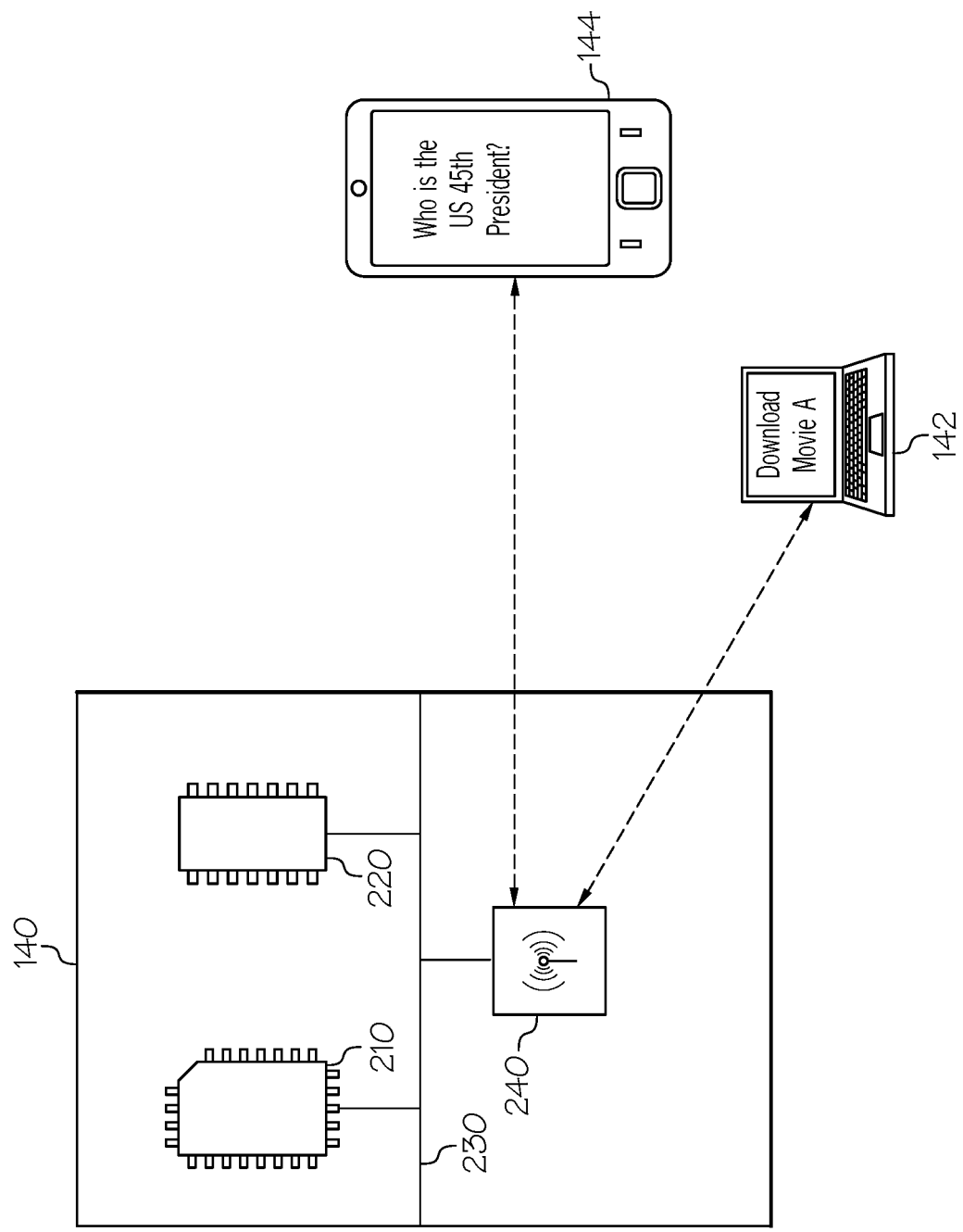
FIG. 2 schematically depicts a moveable server communicating with nearby devices at a location where the internet is not available in accordance with one or more embodiments shown and described herein.

The embodiments disclosed herein include mobile computing systems and methods for accessing data on the internet via a vehicle having a moveable server. Referring generally to FIGS. 1 and 2, a mobile computing system for accessing data on internet includes a vehicle moving between a first geographic location where internet access is not available and a second geographic location where internet access is available, and a moveable server coupled to the vehicle. The moveable server includes a processor, a memory module communicatively coupled to the processor, and machine readable instructions stored in the memory module that, when executed by the processor, cause the moveable server to: receive a query from a computing device at the first geographic location, retrieve data associated with the query from the moveable server and provide the data to the computing device in response to the query if the data associated with the query is available in the moveable server at the first geographic location, store the query in the memory module if the data associated with the query is not available in the moveable server at the first geographic location, execute the stored query at a second geographic location where internet access is available and retrieve data associated with the query, and store the data associated with the query in the memory module for retrieval by the computing device when the moveable server returns to the first geographic location. The present subject matter provides virtual internet access in an area where no internet access is available, such that people in the area can enjoy online content otherwise unavailable.

FIG. 1 schematically depicts a mobile computing system for accessing data on the internet via a vehicle having a moveable server in accordance with one or more embodiments shown and described herein. In FIG. 1, a first geographic location 110 is a location where internet access is not available, and a second geographic location 120 is a location where internet access is available. In embodiments, the mobile computing system includes a vehicle 130 and a moveable server 140. In another embodiment, the mobile computing system may be the moveable server 140. The vehicle 130 moves between the first geographic location 110 and the second geographic location 120. The vehicle 130 may be an automobile or any other passenger or non-passenger vehicle such as, for example, a terrestrial, aquatic, and/or airborne vehicle. In some embodiments, the vehicle 130 may be an autonomous vehicle that navigates its environment with limited human input or without human input. In another embodiment, the vehicle 130 may be an unmanned aerial vehicle (UAV), commonly known as a drone.

The vehicle 130 includes the moveable server 140. The moveable server 140 is attached to the vehicle 130 and moves along with the vehicle 130. In other embodiments, the moveable server 140 may be integrated with the vehicle 130 or other moving objects. The details of the moveable server 140 will be described with reference to FIG. 2 below. The moveable server 140 may communicate with devices proximate to the moveable server 140. For example, the moveable server 140 communicates with a personal computer 142 and a smartphone 144 as shown in FIG. 1. Although FIG. 1 depicts the moveable server 140 communicates with two devices, the vehicle 130 may communicate with less than two devices or more than two devices. The moveable server 140 may communicate with devices proximate to the moveable server 140 via various communication protocol including, but not limited to, Wi-Fi, Bluetooth, Near Field Technology (NFC), or any wired connection. The moveable server 140 receives queries from the personal computer 142 and the smartphone 144 and transmits data related to the queries to the personal computer 142 and the smartphone 144, if the moveable server 140 can retrieve the data from its current memory. If the current memory of the moveable server 140 does not include the data related to the queries, the memory stores the queries until the moveable server 140 gains access to the internet and retrieves data form the internet.

In the second geographic location 120, the moveable server 140 of the vehicle 130 can access the internet via a network 150. The moveable server 140 may access the internet via the network 150, request data related to the queries received from the personal computer 142 and the smartphone 144, and receive the data from the internet via the network 150. When the moveable server 140 returns to the first geographic location 110, the moveable server 140 may automatically transmit the data retrieved from the internet to corresponding devices proximate to the vehicle 130. In some embodiment, the moveable server 140 may access the internet through a wired connection, for example, via an Ethernet cable.

The network 150 may include one or more computer networks (e.g., a personal area network, a local area network, or a wide area network), cellular networks, satellite networks and/or a global positioning system and combinations thereof. Accordingly, the moveable server 140 can be communicatively coupled to the network 150 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Referring now to FIG. 2, one embodiment of a moveable server 140 communicating with nearby devices in a location where the internet is not available is schematically depicted. The moveable server 140 includes one or more processors 210, one or more memory modules 220, a communication path 230, and network interface hardware 240.

Each of the one or more processors 210 of the moveable server 140 may be any device capable of executing machine readable instructions. Accordingly, each of the one or more processors 210 may be a controller, an integrated circuit, a microchip, a computer, or any other computing device. Each of the one or more processors 210 is communicatively coupled to the other components by the communication path 230. Accordingly, the communication path 230 may communicatively couple any number of processors with one another, and allow the components coupled to the communication path 230 to operate in a distributed computing environment. Specifically, each of the components may operate as a node that may send and/or receive data.

Still referring to FIG. 2, the communication path 230 may be formed from any medium that is capable of transmitting a signal such as, for example, conductive wires, conductive traces, optical waveguides, or the like. Moreover, the communication path 230 may be formed from a combination of mediums capable of transmitting signals. In one embodiment, the communication path 230 comprises a combination of conductive traces, conductive wires, connectors, and buses that cooperate to permit the transmission of electrical data signals to components such as processors, memories, sensors, input devices, output devices, and communication devices. Accordingly, the communication path 230 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 230 communicatively couples the various components of the moveable server 140. As used herein, the term "communicatively coupled" means that coupled components are capable of exchanging data signals with one another such as, for example, electrical signals via conductive medium, electromagnetic signals via air, optical signals via optical waveguides, and the like.

Each of the one or more memory modules 220 of the moveable server 140 is coupled to the communication path 230 and communicatively coupled to the one or more processors 210. Each of the one or more memory modules 220 may comprise ROM, flash memories, hard drives, or any device capable of storing machine readable instructions such that the machine readable instructions can be accessed and executed by the one or more processors 210. The machine readable instructions may comprise logic or algorithm(s) written in any programming language of any generation (e.g., 1GL, 2GL, 3GL, 4GL, or 5GL) such as, for example, machine language that may be directly executed by the one or more processors 210, or assembly language, object-oriented programming (OOP), scripting languages, microcode, etc., that may be compiled or assembled into machine readable instructions and stored in the one or more memory modules 220. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The network interface hardware 240 is coupled to the communication path 230 and communicatively coupled to the one or more processors 210. The network interface hardware 240 may be any device capable of transmitting and/or receiving data via a network. Accordingly, the network interface hardware 240 can include a communication transceiver for sending and/or receiving any wired or wireless communication. For example, the network interface hardware 240 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 240 includes hardware configured to operate in accordance with the Wi-Fi wireless communication protocol. In some embodiments, the network interface hardware 240 includes hardware configured to operate in accordance with the Bluetooth wireless communication protocol. In another embodiment, the network interface hardware 240 includes hardware configured to operate in accordance with a wireless communication protocol other than Bluetooth.

In FIG. 2, the network interface hardware 240 communicates with the personal computer 142 and the smartphone 144. For example, the network interface hardware 240 receives a query "Download movie A" from the personal computer 142 via Wi-Fi communication, and receives a query "Who is the U.S. 45$^{th}$ president?" from the smartphone 144 via Wi-Fi communication. In embodiments, the personal computer 142 and the smartphone 144 do not have access to the internet because they are located in the first geographic location 110 (See FIG. 1) where no internet access is available. For communication between the moveable server 140 and the personal computer 142 and the smartphone 144, internet access is not required. The one or more processors 210 receive the queries from the personal computer 142 and the smartphone 144, and retrieve data from the one or more memory modules 220 if the data is available in the one or more memory modules 220. If the data is not available in the one or more memory modules 220, the moveable server 140 stores the query in the one or more memory modules 220.

Figure 3:
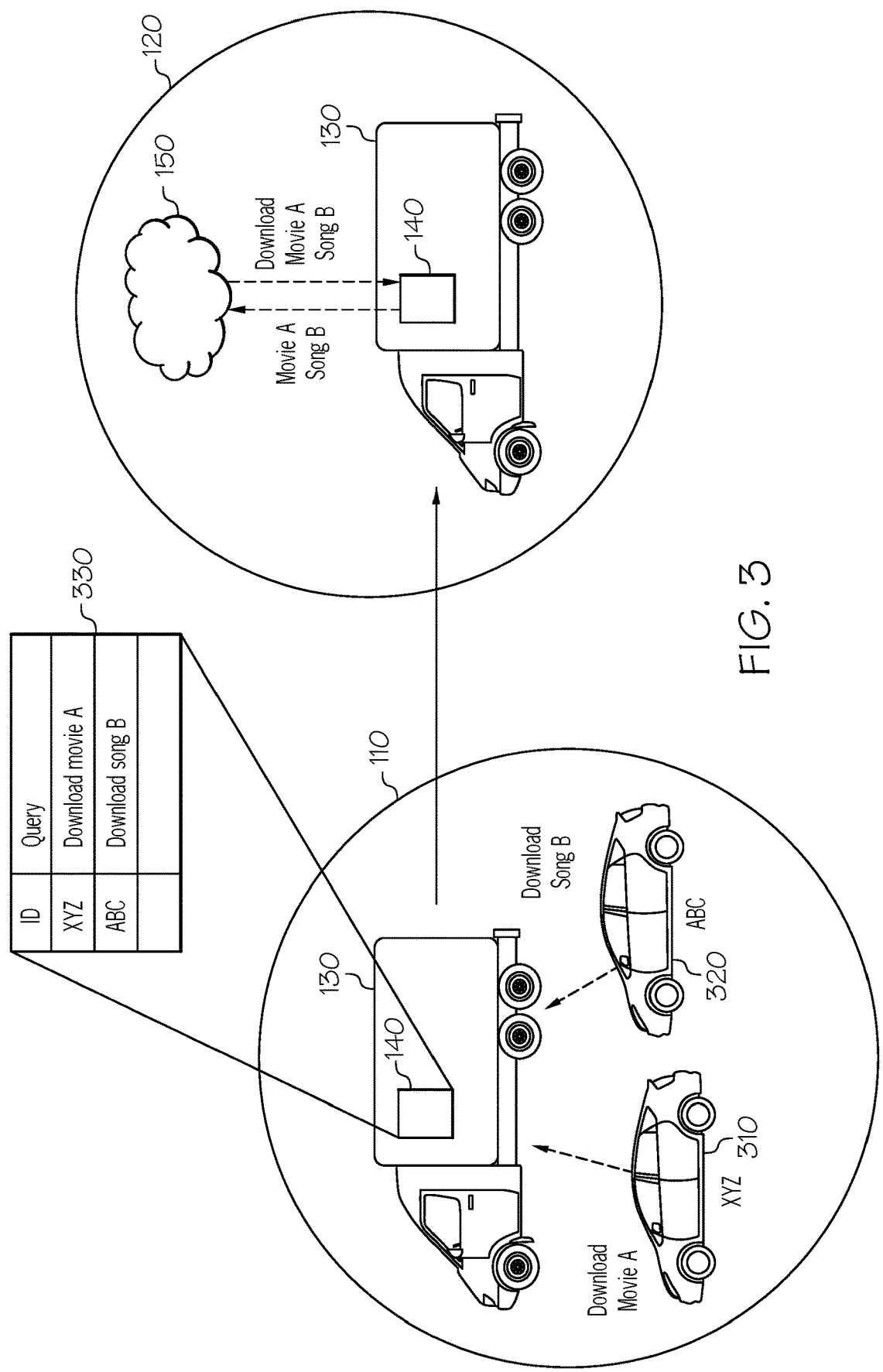
FIG. 3 schematically depicts a mobile computing system for accessing data on the internet in accordance with another embodiment shown and described herein.

FIG. 3 depicts a mobile computing system for accessing data in the internet in accordance with another embodiment shown and described herein. In embodiments, the vehicle 130 and other vehicles including a vehicle 310 and a vehicle 320 are in the first geographic location 110. The first geographic location 110 may be a camping site where no internet access is available. The vehicle 310 has an identification code of XYZ, such as a vehicle identification number, and the vehicle 320 has an identification code of ABC. The vehicle 310 sends a request for downloading movie A to the moveable server 140 along with its identification code of XYZ via available wireless or wired communication, e.g., Wi-Fi communication, or USB connection. The vehicle 320 sends a request for downloading song B to the moveable server 140 along with its identification code of ABC via available wireless or wired communication. In response, the moveable server 140 searches for movie A and song B in its one or more memory modules 220. If movie A is available in its one or more memory modules 220, then the moveable server 140 transmits movie A to the vehicle 310 via available wireless or wired communication. Similarly, if song B is available in its one or more memory modules 220, the moveable server 140 transmits song A to the vehicle 320 via available wireless or wired communication.

If movie A or the song B is not available in the one or more memory modules 220, the moveable server 140 stores the queries received from the vehicle 310 and the vehicle 320 along with their identification codes in the one or more memory modules 220. For example, the queries and the identification codes are stored as a searchable database 330 as shown in FIG. 3. When the vehicle 130 moves to the second geographic location 120 where internet access is available, the moveable server 140 accesses the internet via the network 150. For example, the network interface hardware 240 transmits queries for downloading movie A and song B to the network 150. Then, the moveable server 140 downloads and stores movie A and song B in the one or more memory modules 220 from the network 150. The movie A and song B may be stored in association with the identification codes of the vehicles 310 and 320, such that movie A is associated with identification code XYZ and song B is associated with identification code ABC.

Once the vehicle 130 returns to the first geographic location 110, the moveable server 140 automatically determines whether the vehicles 310 and 320 are proximate to the moveable server 140, and transmits movie A and song B to the vehicle 310 and vehicle 320, respectively if they are located nearby. The moveable server 140 may delete data retrieved from the internet after a certain period of time. For example, the moveable server 140 may delete movie A 90 days after the moveable server 140 downloaded the movie A from the internet. In another example, the moveable server 140 may determine whether there was any query requesting movie A for a certain period of time, e.g., recent 30 days, and delete movie A if there was no query requesting movie A for the certain period of time.

Figure 4:
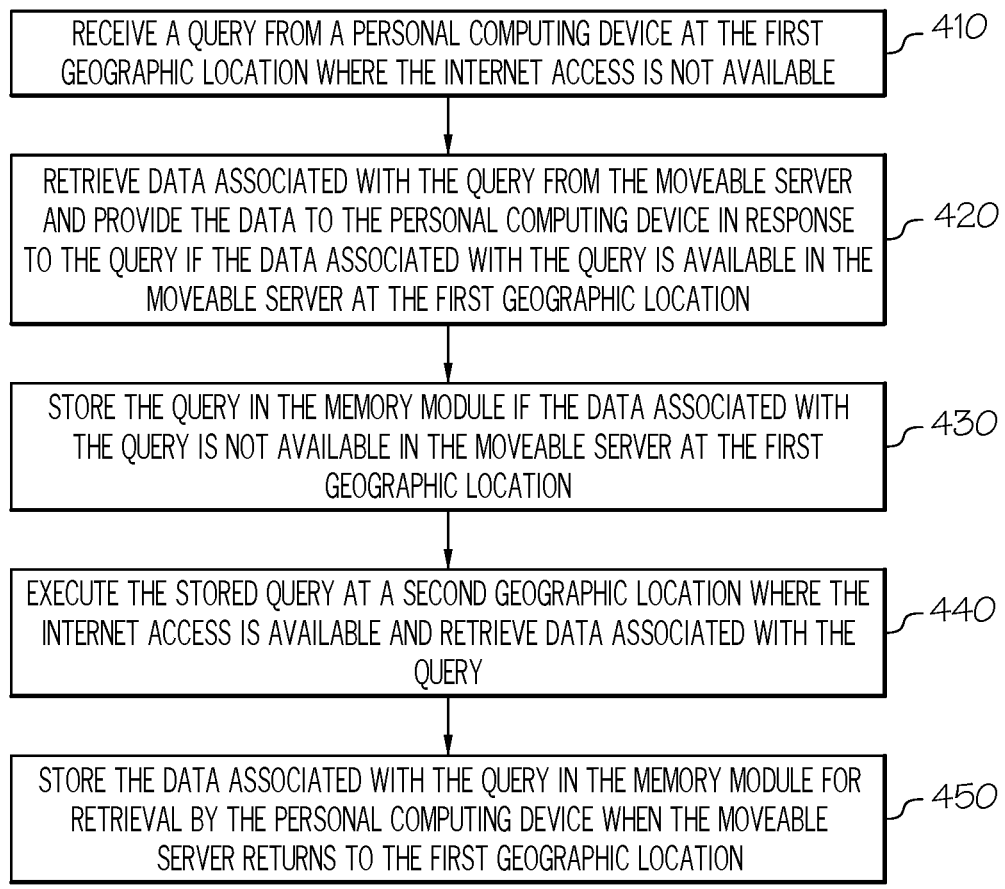
FIG. 4 schematically depicts a flowchart for accessing data on the internet via a mobile computing system in accordance with one or more embodiments shown and described herein.

FIG. 4 schematically depicts a flowchart for accessing data in the internet via a vehicle having a moveable server in accordance with one or more embodiments shown and described herein.

In step 410, the moveable server 140 receives a query from a computing device at the first geographic location 110 where internet access is not available. The moveable server 140 may receive more than one query from the computing device or a query from each of a plurality of computing devices. The computing device may be any device including, but not limited to, a smartphone, a laptop computer, a tablet personal computer, a smart wearable device, a telematics device in a vehicle, etc. A query may be a request for information, a request for media, such as songs, movies, images, etc, or a request for electronic currency, such as bitcoin or another blockchain-based electronic currency.

In step 420, the moveable server 140 retrieves data associated with the query from the one or more memory modules 220 and provides the data to the computing device in response to the query, if the data associated with the query is available in the one or more memory modules 220 of the moveable server 140 at the first geographic location 110. In embodiments, the data may be pre-stored in the one or more memory modules 220. For example, before the moveable server 140 receives the query from the computing device at the first geographic location 110, the moveable server 140 was at a location where internet access is available, e.g., at the second geographic location 120, downloaded data related to the query from the internet, and stored the data in the one or more memory modules 220. In another embodiment, the moveable server 140 may communicate with other devices proximate to the moveable server 140 and collect data from the other devices nearby. For example, when the moveable server 140 receives a query from the vehicle 310 requesting movie A, the moveable server 140 may transmit the query from the vehicle 310 to other devices within a communication range of the moveable server 140, and receive movie A from one of the other devices, e.g., from the vehicle 320, if the vehicle 320 stores the movie A. The movie A may be stored in the one or more memory modules 220 of the moveable server 140 for a certain period of time in order to distribute movie A to other computing devices which send a query requesting movie A.

In step 430, the moveable server 140 stores the query in the one or more memory modules 220, if the data associated with the query is not available in the moveable server 140 at the first geographic location. The moveable server 140 may store the query in association with an identification code for a device sending the query. For example, when the moveable server 140 receives a query requesting movie A from the vehicle 310 and movie A is not available in the one or more memory modules 220 of the moveable server 140, the moveable server 140 stores the query in association with an identification code for the vehicle 310.

In step 440, the moveable server 140 executes the stored query at a second geographic location where internet access is available and retrieves data associated with the query from the internet. The vehicle 130 including the moveable server 140 may travel to a different place after the moveable server 140 stores the query in step 430. For example, the vehicle 130 may travel to the second geographic location 120 where internet access is available. Once internet access is available, the moveable server 140 executes the stored query and retrieves data associated with the query from the internet. For example, the moveable server 140 downloads movie A with respect to the query received from the vehicle 310 by accessing to the network 150.

In step 450, the moveable server 140 stores the data associated with the query in the one or more memory modules 220 for retrieval by the computing device when the moveable server 140 returns to the first geographic location 110. The data may be stored in the one or more memory modules 220 in association with an identification code of the device that sent the query. For example, movie A is stored in the one or more memory modules 220 in association with an identification code of XYZ for the vehicle 310 which sent a query requesting movie A.

When the vehicle 130 returns to the first geographic location 110, the vehicle 310 may retrieve the movie A from the moveable server 140 without accessing the internet. The moveable server 140 may determine the presence of the vehicle 310 when the vehicle 130 returns to the first geographic location 110. For example, if the moveable server 140 receives a signal from the vehicle 310 along with the identification code for the vehicle 310, the moveable server 140 may determine that the vehicle 310 is within a communication range of the moveable server 140 at the first geographic location 110. In response to the determination that the vehicle 310 is within the communication range of the moveable server 140, the moveable server 140 may automatically transmit movie A stored in the one or more memory modules 220 to the vehicle 310.

It should be understood that embodiments described herein are directed to a mobile computing system for accessing data on internet using a moveable server included in a vehicle. A mobile computing system for accessing data moves between a first geographic location where internet access is not available and a second geographic location where internet access is available. The mobile computing system includes one or more processors, one or more memory modules communicatively coupled to the one or more processors, and machine readable instructions stored in the one or more memory modules that, when executed by the one or more processors, cause the mobile computing system to: receive a query from a computing device at the first geographic location where internet access is not available, retrieve data associated with the query from the mobile computing system and provide the data to the computing device in response to the query if the data associated with the query is available in the mobile computing system at the first geographic location, store the query in the one or more memory modules if the data associated with the query is not available in the mobile computing system at the first geographic location, execute the stored query at the second geographic location where internet access is available and retrieve data associated with the query from the internet, and store the data associated with the query in the one or more memory modules for retrieval by the computing device when the mobile computing system returns to the first geographic location. The present subject matter provides virtual internet access in an area where no internet access is available, such that people in the area can enjoy online content otherwise unavailable.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mobile computing system for accessing data, the mobile computing system moving between a first geographic location where internet access is not available and a second geographic location where internet access is available, the mobile computing system, comprising:
one or more processors;
one or more memory modules; and
machine readable instructions stored in the one or more memory modules that, when executed by the one or more processors, cause the mobile computing system to:
receive a query from a computing device at the first geographic location where internet access is not available; and
in response to determination that data associated with the query is not available in the mobile computing system at the first geographic location:
store the query in the one or more memory modules;
retrieve data associated with the stored query from the internet in response to the mobile computing system being at the second geographic location;
determine whether the computing device is within a communication range of the mobile computing system in response to the mobile computing system returning to the first geographic location from the second geographic location; and
transmit the data retrieved from the internet to the computing device in response to the determination that the computing device is within the communication range of the mobile computing system.

2. The mobile computing system of claim 1, wherein the machine readable instructions stored in the one or more memory modules, when executed by the one or more processors, further cause the mobile computing system to:
receive an identification code for the computing device; and
store the query from the computing device in association with the identification code.

3. The mobile computing system of claim 1, wherein the machine readable instructions stored in the one or more memory modules, when executed by the one or more processors, further cause the mobile computing system to:
send the query from the computing device to one or more other computing devices at the first geographic location if the data associated with the query is not available in the mobile computing system at the first geographic location; and
receive the data associated with the query from one of the one or more other computing devices.

4. The mobile computing system of claim 1, wherein the machine readable instructions stored in the one or more memory modules, when executed by the one or more processors further cause the mobile computing system to:
delete the data associated with the query from the one or more memory modules a certain period of time after the data is stored in the one or more memory modules.

5. The mobile computing system of claim 1, wherein the machine readable instructions stored in the one or more memory modules, when executed by the one or more processors, further cause the mobile computing system to:
delete the data associated with the query from the one or more memory modules if the mobile computing system does not receive a new query related to the data for a certain period of time.

6. The mobile computing system of claim 1, wherein the mobile computing system receives the query from the computing device via at least one of Wi-Fi communication, Bluetooth, Near Field Communication, and wired communication.

7. A method for accessing data comprising:
receiving, by a mobile computing system, a query from a computing device at a first geographic location where internet access is not available; and
in response to determining that data associated with the query is not available in the mobile computing system at the first geographic location:
storing the query in one or more memory modules of the mobile computing system;
retrieving data associated with the stored query from the internet in response to the mobile computing system being at a second geographic location where internet access is available;
determining whether the computing device is within a communication range of the mobile computing system in response to the mobile computing system returning to the first geographic location from the second geographic location; and
transmitting the data retrieved from the internet to the computing device in response to the determination that the computing device is within the communication range of the mobile computing system.

8. The method of claim 7, further comprising:
receiving an identification code for the computing device; and
storing the query from the computing device in association with the identification code.

9. The method of claim 7, further comprising:
sending the query from the computing device to one or more other computing devices at the first geographic location if the data associated with the query is not available in the mobile computing system at the first geographic location; and
receiving the data associated with the query from one of the one or more other computing devices.

10. The method of claim 7, wherein the mobile computing system comprises an unmanned aerial vehicle.

11. The method of claim 7, wherein the mobile computing system comprises an autonomous vehicle.

12. The method of claim 7, wherein the mobile computing system receives the query from the computing device via at least one of Wi-Fi communication, Bluetooth, Near Field Communication, and wired communication.

13. A mobile computing system for accessing data, the mobile computing system comprises:
a vehicle; and
a moveable server coupled to the vehicle,
wherein the vehicle moves between a first geographic location where internet access is not available and a second geographic location where internet access is available,
the moveable server comprises:
one or more processors;
one or more memory modules communicatively coupled to the one or more processors; and
machine readable instructions stored in the one or more memory modules that, when executed by the one or more processors, cause the moveable server to:

receive a query from a computing device at the first geographic location where internet access is not available;

in response to determination that data associated with the query is not available in the moveable server at the first geographic location;

store the query in the one or more memory modules;

retrieve data associated with the query from the internet in response to the mobile computing system being at the second geographic location;

determine whether the computing device is within a communication range of the mobile computing system in response to the mobile computing system returning to the first geographic location from the second geographic location; and transmit the data retrieved from the internet to the computing device in response to the determination that the computing device is within the communication range of the mobile computing system.

14. The mobile computing system of claim 13, wherein the vehicle is an unmanned aerial vehicle.

15. The mobile computing system of claim 13, wherein the vehicle is an autonomous vehicle.

16. The mobile computing system of claim 13, wherein the machine readable instructions stored in the one or more memory modules, when executed by the one or more processors, further cause the moveable server to:

receive an identification code for the computing device; and store the query from the computing device in association with the identification code.

17. The mobile computing system of claim 13, wherein the machine readable instructions stored in the one or more memory modules, when executed by the one or more processors, further cause the moveable server to:

send the query from the computing device to one or more other computing devices at the first geographic location if the data associated with the query is not available in the moveable server at the first geographic location; and receive the data associated with the query from one of the one or more other computing devices.

18. The mobile computing system of claim 1, wherein the machine readable instructions stored in the one or more memory modules, when executed by the one or more processors, further cause the mobile computing system to:

retrieve data associated with the query from the mobile computing system and provide the data to the computing device in response to the query if the data associated with the query is available in the mobile computing system at the first geographic location.

19. The method of claim 7, further comprising:

retrieving data associated with the query from one or more memory modules of the mobile computing system and providing the data to the computing device in response to the query if the data associated with the query is available in the one or more memory modules of the mobile computing system at the first geographic location.

20. The mobile computing system of claim 13, wherein the machine readable instructions stored in the one or more memory modules, when executed by the one or more processors, further cause the moveable server to:

retrieve data associated with the query from the moveable server and provide the data to the computing device in response to the query if the data associated with the query is available in the moveable server at the first geographic location.

* * * * *